United States Patent [19]

Kondo et al.

[11] Patent Number: 4,688,989
[45] Date of Patent: Aug. 25, 1987

[54] GAS ROTARY MACHINE

[75] Inventors: Hideki Kondo, Tokyo; Noburu Shimizu; Yoichi Kanemitsu, both of Kanagawa, all of Japan

[73] Assignee: Ebara Corporation, Tokyo, Japan

[21] Appl. No.: 647,150

[22] PCT Filed: Jun. 29, 1984

[86] PCT No.: PCT/JP84/00335

§ 371 Date: Sep. 5, 1984

§ 102(e) Date: Sep. 5, 1984

[87] PCT Pub. No.: WO85/01328

PCT Pub. Date: Mar. 28, 1985

[30] Foreign Application Priority Data

Sep. 22, 1983 [JP] Japan .................................. 58-174141
Nov. 21, 1983 [JP] Japan .................................. 58-217847
Nov. 21, 1983 [JP] Japan .................................. 58-217848

[51] Int. Cl.[4] ............................................. F01D 15/12
[52] U.S. Cl. ................................... 415/122 R; 415/113
[58] Field of Search ................... 415/122 R, 110, 111, 415/112, 113, 108, 107, 104, 170 R

[56] References Cited

U.S. PATENT DOCUMENTS

| 2,980,391 | 4/1961 | Hill | 415/108 |
|---|---|---|---|
| 3,330,476 | 7/1967 | Bruyere | 415/122 |
| 3,424,372 | 1/1969 | Blattner et al. | 415/122 R |
| 3,547,241 | 12/1970 | Tungate | 415/122 |
| 3,597,105 | 8/1971 | Sadler | 415/122 |
| 3,635,581 | 1/1972 | Nichols | 415/122 |
| 3,650,634 | 3/1972 | Osborne et al. | 415/175 |
| 3,734,637 | 5/1973 | Beck, Jr. | 415/122 |
| 3,869,133 | 3/1975 | Pesendorfer | 277/27 |
| 3,918,830 | 11/1975 | Schneider | 415/122 |
| 4,105,372 | 8/1978 | Mishina et al. | 415/122 |

FOREIGN PATENT DOCUMENTS

| 1087138 | 8/1960 | Fed. Rep. of Germany | 415/113 |
|---|---|---|---|
| 2443204 | 3/1976 | Fed. Rep. of Germany | 415/110 |
| 44-14243 | 6/1969 | Japan . | |
| 46-18 | 9/1971 | Japan . | |
| 46-19 | 9/1971 | Japan . | |
| 51-23106 | 2/1976 | Japan . | |
| 51-105607 | 9/1976 | Japan . | |
| 53-50083 | 12/1978 | Japan . | |
| 7408212 | 12/1974 | Netherlands | 415/122 R |

OTHER PUBLICATIONS

Sunflo Blower Series B-1000, Bulletin 14.4, Sunstrand Fluid Handling, Arvada, Colorado, Mar. 1978.

Primary Examiner—Robert E. Garrett
Assistant Examiner—John Kwon
Attorney, Agent, or Firm—Wenderoth, Lind & Ponack

[57] ABSTRACT

A gas rotary machine of a type which is driven by a driving system with two parallel axes wherein a pinion shaft supporting a pinion is made as a flexible shaft and damper bearings including ball/roller bearings are employed to support the flexible shaft so that the whole machine is kept compact and the power required therefor is reduced.

7 Claims, 4 Drawing Figures

GAS ROTARY MACHINE

FIELD OF THE INVENTION

The present invention relates to a gas rotary machine such as a blower or a compressor which is provided with a speed-up gear mechanism for rotating an impeller therethrough.

BACKGROUND OF THE INVENTION

Heretofore, an impeller, for example in a turbo compressor, has been rotated at a high speed by an electric motor through acceleration by a speed-up mechanism. Recently, the rotational speed of such a machine has been made as high as 30,000 r.p.m. or more. In cases where there is a need for the compressor to be compact and for the number of components to be reduced as much as possible, it is customary to provide a pinion on an impeller shaft and a gear for driving the pinion on a drive shaft disposed parallel to the pinion shaft so that the arrangement above forms a parallel driving system with two axes for the two shafts.

In the above arrangement of the gears, highly accurate meshing of gears is required if rotation is to be made at high speeds. To such end, high accuracy is required with respect to maintaining the desired distance between the two axes and parallelism between the two axes and, further, a precise tolerance is demanded in the fabrication of a gear casing, parts relating to bearings and assembly operation, etc., for example a tolerance in the range of a few hundredths to a few thousandths of millimeters with respect to the distance between the axes. (As one example, the tolerance of +0.032 −0 mm is demanded for a case where the distance between the axes is 250 mm.)

In order to assure accurate meshing of gears, it is necessary to reduce deflection of the shaft and to prevent vibration of the shaft. Therefore, endeavors have been made to increase the shaft rigidity and to select the critical speed to be substantially higher than the ordinary speed of revolution.

However, if it is intended to increase the rigidity of the shaft, the respective sizes of the shaft itself, the bearings and the gear casing would become large whereby the weight of the apparatus employing such shaft becomes heavy. In order to avoid such a tendency, a so-called flexible shaft is employed wherein the rigidity of the flexible shaft is reduced and adapted to be used at a point beyond a primary critical speed.

With the usage of the flexible shaft, the respective dimensions of the components of the apparatus would be reduced; however, upon actuation of such flexible shaft, it must pass the point of the critical speed thereof. For securely supporting the flexible shaft at the time of its passing the critical speed point and under a normal operative speed which is above the critical speed, it becomes necessary to employ a special bearing means such as a tilting pad type bearing which is a sliding bearing.

However, such a slide bearing or plain bearing is inferior in that its mechanical loss is relatively large, fabrication thereof is not easy and it is expensive. Therefore, it has been desired to employ a flexible shaft while making it possible to use a ball/roller bearing. However, in the case where roller bearings are employed for the flexible shaft, severe vibration would be produced when the rotation of the flexible shaft passes the critical speed point and the degree of vibration after passing the critical speed point may remain large. Thus, it has been considered to be impractical to employ the flexible shaft with the conventional construction using ball/roller bearings.

On the pinion shaft of the high speed side, a thrust may be imposed from the impeller or from helical gears if the pinion is of a helical gear so that an excessive force may be loaded on the bearings for the high speed side shaft which would affect the operable life, etc. of the bearings.

If the arrangements were not of a system using two parallel axes, a damper bearing would be used to solve the vibration problems in employing the flexible shaft. However, in the case where the driving relationship is established by two parallel axes, the accuracy required for the distance between the two parallel axes for transmitting torque therebetween is quite strict and, thus, it has been generally considered that employment of damper bearings which include ball/roller bearings in the two parallel axes system is difficult since use of a damper bearing in such system would permit displacement of the axis due to the load imposed in a direction normal to the axis. Accordingly, if a flexible shaft is employed in the two parallel axes driving system for transmitting torque between the axes, it has heretofore been futile up to employ ball/roller bearings for a flexible shaft because the damper bearings including ball/roller bearings are regarded as unacceptable in the two parallel axes driving system.

SUMMARY OF THE INVENTION

In view of the state of the prior art as discussed above, it is an object of the present invention to provide a gas rotary machine with a driving system employing two parallel axes for which high speed rotation is required and wherein a high speed shaft thereof is made as a flexible shaft and ball/roller bearings are employed so as to make the whole machine compact and moderate the strict requirements for fabrication and tolerance in assembly.

In the gas rotary machine with a driving system employing two parallel axes according to the present invention, a high speed side shaft, i.e. a pinion shaft, is made as a flexible shaft and this flexible shaft is arranged to be supported by damper bearings using ball/roller bearings therein whereby the above-stated object is achieved.

Incidentally, the arrangement of the rotary machine according to the present invention is such that the thrust imposed on the pinion shaft is borne by a bearing for the lower speed shaft and not by bearings supporting the higher speed shaft.

THE BEST MODE OF PRACTICING THE PRESENT INVENTION

Figure 1:
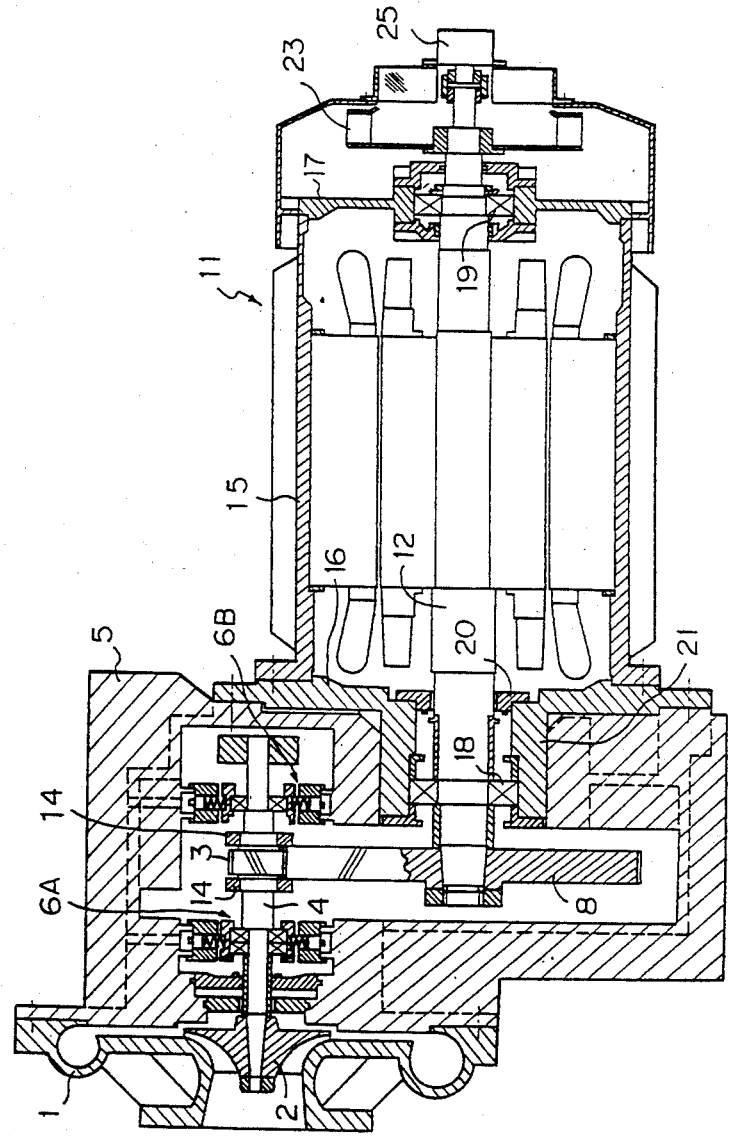
FIG. 1 is a schematic cross sectional view illustraring a gas rotary machine as an embodiment of the present invention.

Now an embodiment according to the present invention will be explained referring to the accompanying drawings. In FIG. 1, an embodiment according to the present invention is illustrated as a compressor.

Referring to FIG. 1, an impeller 2 is mounted on a high speed pinion shaft 4 at one end thereof so as to be rotatable within a compressor casing 1, a pinion 3 being mounted on the pinion shaft 4. The pinion shaft 4 is journalled within a gear box casing 5 by damper bearings 6A and 6B.

A gear 8 to be meshed with the pinion 3 is mounted at one end of a drive shaft 12 of a drive motor 11 in a meshing relation with the pinion 3 so that the pinion shaft 4 is rotated when the motor 11 is actuated. The rotor shaft 12 is journalled by bearings 18 and 19 disposed in end brackets 16 and 17, respectively, of a motor casing 15. The end bracket 16 is provided with a support portion 21 which supports the bearing 18. The support portion 21 is arranged to project into the gear box casing 5 and is fitted in the gear box casing 5 and adapted to support the bearing 18 thereon. As will be explained later, the bearing 18 is selected to be of such a type as to be able to bear the radial load as well as the thrust load. The gear 8, as touched upon above, is supported at the end of the shaft in a overhanging mode. An oil seal 20 is received in the end bracket 16 so as to close the portion around the shaft in order to seal lubrication oil in the gear box casing 5.

At the opposite sides of the pinion 3, thrust transmitting collars 14 are mounted on the pinion shaft 4 so as to contact the opposite sides of the gear 8 whereby the axial position of the pinion shaft 4 is determined and the thrust imposed on the pinion shaft 4 is transmitted to the gear 8. This is the reason for selecting the bearing 18 to be of the type which is capable of bearing the thrust and the thrust transmitted to the gear 8 is received by the bearing 18.

Incidentally, an oil pump 25 for circulating lubricating oil and a fan 23 for cooling are shown. The oil pump 25 feeds lubricating oil to the gear casing by way of circulation.

Figure 2:
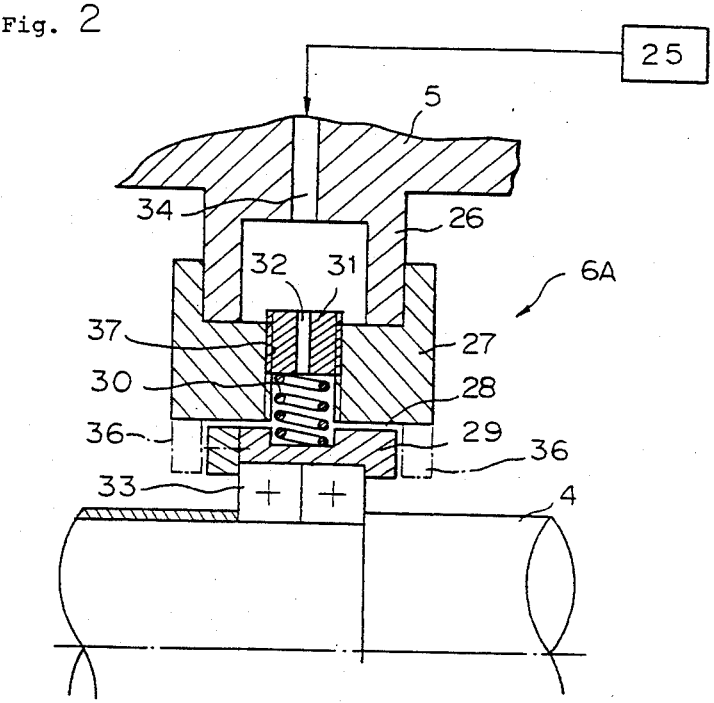
FIG. 2, is a schematic cross sectional view of a damper employed in the machine shown in FIG. 1.

Referring to FIG. 2, an enlarged view of a portion of the damper bearing 6A is shown.

In a part of the gear box casing 5 and around the pinion shaft 4, a cylindrical retaining portion 26 is formed, onto which an outer peripheral ring 27 of the damper bearing is fitted. An inner peripheral ring 29 is elastically retained through springs 30 such as to be spaced from the inner surface of the outer peripheral ring 27 by a gap 28. Springs 30 are disposed around the periphery of the outer peripheral ring 27, with an angular spacing of, for example, 45°. The springs 30 are received in radial holes 37 provided in the outer peripheral ring 27 and are arrested by spring seat members 31 which are threadably engaging female threads formed in the holes 37. The springs 30 and the gap 28 are adjusted and set by rotating the seat members 31. Inside of the inner peripheral ring 29 are retained ball/roller bearings 33 which rotatably support the pinion shaft 4. An oil passage 34 is provided in the gear box casing 5 and an oil passage 32 is provided in the spring seat member 31. Through these oil passages, lubrication oil is fed to the gap 28 of the damper bearing. The lubrication oil is also supplied to the ball/roller bearings 33 through diverging oil passages not shown.

The construction of the damper bearing 6B is similar to the bearing 6A shown in FIG. 2. (In FIG. 1, it is illustrated that the bearing 6B supports a single ball/roller bearing and the bearing 6A supports two ball/roller bearings. However, they may be constructed to support the same number or a different number of ball/roller bearings as illustrated, depending on the situation.)

The pinion shaft 4 supported by the damper bearings 6A and 6B will pass the point of the critical speed upon being rotated. Should the inner peripheral ring 29 be subjected to vibration at that time, the squeezing effect of the oil film in the gap 28 will dampen the vibration such as to be moderated and absorbed by such damping. The elasticity of the springs 30 is adjusted so that the radial displacement of the inner peripheral ring 29 may not cause contact between the inner peripheral ring 29 and the inner side surface of the outer peripheral ring 27 when a force is applied to the pinion shaft 4 in the normal direction (radial direction) thereto due to the transmission of torque between the pinion 3 and the gear 8. The actual dimension of the gap, merely as an example, is from 0.2 to 0.3 mm.

It is preferable to effect crowning on the gear surfaces of the pinion 3 and gear 8 in order to maintain a good meshing condition therebetween should the pinion shaft 4 be displaced or canted due to the elastic supporting therefor.

The axial thrust may be imposed on the pinion shaft 4 by the impeller mounted at the end thereof or the helix of the gears in a case where helical gears are employed as the pinion 3 and gear 8. However, due to the presence of the thrust transmitting collars 14, such thrust is transmitted to the drive shaft 12 of the motor through the gear 8. The thrust transmitted as above will be borne by the bearing 18.

Should there be no thrust transmitting means such as collars 14 as above, it would be necessary to provide flanges 36 illustrated by phantom lines at the inner side of the outer peripheral ring 27 so as to prevent the movement of the inner peripheral ring 29 in the axial direction. Such flanges 36 may interfere with the free radial movement of the inner peripheral ring 29 whereby a sufficient damping effect may be lost. Incidentally, if it is planned to assist the free movement of the inner peripheral ring 29 under the presence of the flanges 36 by enlarging the areas of the flanges 36 to bear the thrust and supplying lubricating oil under high pressure to form a lubricating oil film, the total dimension of the bearing would be increased and circulation of a large amount of lubricating oil would be required which renders such a plan undesirable. (It should be noted that phantom lined flanges 36 are shown for reference only and do not constitute any part of the present invention.)

Figure 3:
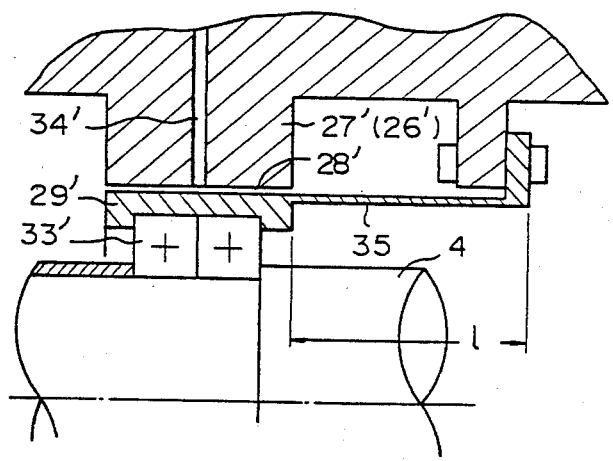
FIG. 3 -is an illustration of the mode of another damper bearing shown for the purpose of comparison with that shown in FIG. 2.

FIG. 3 is also a reference drawing in which an alternative possible arrangement is shown for the case where no flange, such as phantom lined flanges 36 shown in FIG. 2, and no thrust transmitting collar, such as the collars 14, are employed. For the sake of convenience, parts similar to those shown in FIG. 2 are given the same reference numerals as those in FIG. 2 except that a prime (') is added to each of the reference numerals. In FIG. 3, an outer peripheral ring 27' is merged with a cylindrical retaining portion 26', which is a part of the gear casing, and an inner peripheral ring 29' is elastically supported by a thin walled cylindrical spring 35. This construction is arranged to restrict the vibration caused by the squeezing effect of the oil film introduced into the gap 28′, as well as to bear the thrust. However, in order to achieve sufficient damping effect with this construction, it is necessary to arrange the axial length l of the cylindrical portion of the spring 35 to have a certain value whereby the axial length of the total construction becomes lengthy so that there will be further necessity for enlarging the size of the gear casing.

If the phantom lined flanges 36 shown in FIG. 2 or the thrust bearing means with the axial length "l" shown in FIG. 3 are employed, the advantages of the adoption of the flexible shaft and the damper bearings would be deteriorated. However, in the present invention, due to the provision of the thrust transmitting collars 14, the necessity for the phantom lined flanges 36 and the thin walled cylindrical spring 35 is obviated. Accordingly, the damper bearings 6A and 6B are not required to bear the thrust imposed on the pinion shaft 4 and, therefore, the opposing surfaces of the inner peripheral ring 29 and the outer peripheral ring 27, with the gap 28 interposed therebetween, are satisfactory in a simple cylindrical form and thus the fabrication thereof is easy and the amount of oil to be circulated is not necessarily large since it is only necessary to maintain the oil film in the gap 28.

It is preferable to arrange the contact between the thrust transmitting collars 14 and the side surfaces of the gear such that it is made at the portion around the pitch circle of the gear 8 in order that the relative speed between the collars and gear is reduced and it is thereby possible to minimize the area of contact. The mechanical loss due to the provision of the thrust transmitting collars is quite small as compared to that which is derived, for example, from the provision of the phantom lined flanges 36 in FIG. 2.

Figure 4:
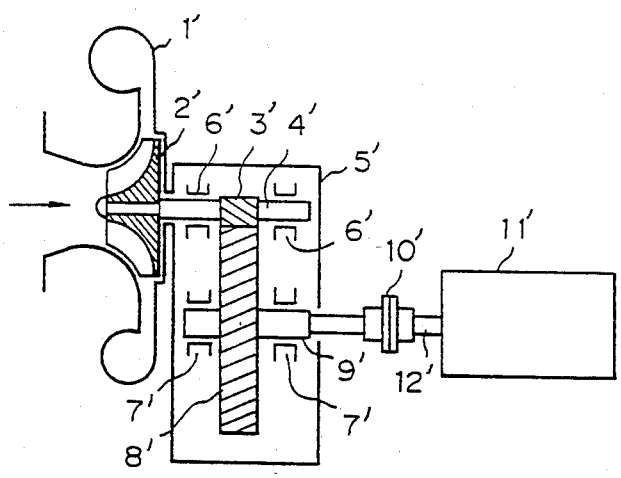
FIG. 4 is presented as a reference showing the conventional gas rotary machine.

In order to explain the size reduction and compactness in the gas rotary machine according to the present invention, a conventional machine of the two parallel axes type is illustrated for reference purposes in FIG. 4. In this drawing, a pinion shaft 4′ having a pinion 3′ is rotatably journalled by bearings 6′ and 6′ within a gear box casing 5′ and an impeller 2′ is supported at one end of the shaft 4′ within a compressor casing 1′. A drive shaft 9′ having a gear 8′ to be meshed with the pinion 3′ is rotatably journalled by bearings 7′ and 7′ within the gear box casing 5′ in parallel relationship with the pinion shaft 4′ so that pinion 3′ and the gear 8′ mesh with each other. For rotating the drive shaft 9′, a motor shaft 12′ of a motor 11′ is connected to the shaft 9′ through a coupling 10′. With the construction shown in FIG. 4 and explained above, the dimension of the whole machine is lengthened in the axial direction, the number of components is increased, alignment between the shafts 9′ and 12′ becomes necessary and, therefore, many man-hours will be required in assembly and maintenance thereof.

In the apparatus according to the present invention, such as, for example, the embodiment shown in FIG. 1, the compactness of the machine is achieved by making the pinion shaft flexible and by employing damper bearings which include ball/roller bearings to support the flexible shaft. The compactness of the present invention is further assisted by the fact that the end bracket of the motor casing is arranged to project into the gear casing and the gear 8 is directly mounted on the extended motor shaft which is jornalled by the bearing 18 in the end bracket of the motor casing 15 whereby use of bearings 7′ and 7′ shown in FIG. 4 is substantially omitted.

UTILIZATION IN INDUSTRY

As explained in the foregoing, the gas rotary machine according to the present invention provides many and versatile characteristic features and advantages which are derived from the introduction of the flexible shaft in the two parallel axes gear driving system and the supporting of the flexible shaft by damper bearings incorporating ball/roller bearings.

Employment of the flexible shaft would be normally considered for reducing the size of the apparatus; however, lateral displacement of the shaft in the two axes gear driving system is generally to be avoided and, thus, damper bearings would not be employed. If such is the case where the pinion shaft is made as a flexible shaft and it is supported by ball/roller bearings, it would become very difficult to have the flexible shaft smoothly pass the point of the critical speed.

The following may be considered as countermeasures designed to cope with such problems, namely:

(a) increasing the diameter of the shaft such that it becomes a rigid shaft; and (b) employing a plain bearing such as a bearing of the tilting pad type.

However, with the countermeasure (a), the circumferential speed of the shaft relative to the bearing is increased and, also, the radial load against the bearing is increased, whereby the endurance life of the bearing is greatly lowered.

With the countermeasure (b), when employing a metal bearing, there would be no necessity to enlarge the diameter of the shaft. However, as compared with the case where ball/roller bearings are employed, there would be several disadvantages such as:

increase in the mechanical loss at the bearing portions, thereby increasing the consumption of electric energy;

complex construction in the bearing portions which adds to the cost of the machine;

increase in the circulating amount of lubricating oil required, which may make the lubricating means expensive and cause energy loss so that the lubricating pump needs to be larger; and a large installation area would be required due to the enlarged dimension of the whole machine.

The above disadvantages are all solved by the present invention.

The provision of the gap 28 between the outer and inner peripheral rings due to the employment of damper bearings permits normal operation of the machine even when there may be unevenness in the gap 28 of the assembly or improper meshing of the gears due to possible errors in machining because the damper bearings compensate for such deficiencies. Therefore, in the present invention, it is possible to moderate the tolerance required in fabrication and assembly compared to that required in the conventional machine.

Further, the ball/roller bearings employed in the high speed pinion shaft in the present invention are not required to bear the thrust load and thus longer endurance life thereof may be expected.

Accordingly, the present invention contributes to the compactness of the machine, a longer enduring life, reduction in the mechanical loss, cost saving in the maintainance and easy handling of the machine etc. whereby the present invention finds its utility in industry with many advantages.

We claim:

1. In a gas rotary machine having a pinion shaft with an impeller at one end thereof, a pinion on an intermediate portion of the pinion shaft, a drive shaft parallel to the pinion shaft, the drive shaft having a free end spaced from bearing means rotatably supporting the drive shaft, a gear on the free end of the drive shaft engaging the pinion, the improvement comprising:

a flexible pinion shaft as the pinion shaft;

damper bearings supporting said flexible pinion shaft, each of said damper bearings including an outer ring fixed with respect to said flexible pinion shaft, an inner ring elastically disposed on an inner peripheral surface of said outer ring, said inner ring forming an annular gap between an outer peripheral surface thereof and said inner peripheral surface of said outer ring, ball or roller bearing means disposed between said inner ring and said flexible pinion shaft for supporting said flexible pinion shaft and means for directing lubricating liquid into said annular gap; and a pair of thrust transmitting collars disposed on said flexible pinion shaft, each of said thrust transmitting collars mounted on opposite sides of the pinion, said collars extending radially from said flexible pinion shaft to contact opposite sides of the gear on the drive shaft for transmitting thrust imposed on said flexible pinion shaft to the drive shaft.

2. The gas rotary machine of claim 1, wherein adjustable spring means is disposed between said outer ring and said inner ring for adjusting displacement of said inner ring with respect to said outer ring, whereby contact is prevented between said inner ring and said outer ring due to torque applied to said flexible pinion shaft.

3. The gas rotary machine of claims 1, wherein said means for directing lubricating liquid comprises radial holes in said outer ring and means connecting said radial holes to a lubricating liquid supply source for supplying lubricating liquid to said radial holes.

4. A gas rotary machine comprising:

a motor casing;

a motor mounted in said motor casing;

a drive shaft rotatably mounted on bearing means in said motor casing and driven by said motor, a free end of said drive shaft extending through an end of said motor casing;

a gear mounted outside of said motor casing on said free end of said drive shaft;

a gear box casing disposed adjacent said end of said motor casing, said gear box casing containing said gear and said free end of said drive shaft;

a flexible pinion shaft rotatably mounted in said gear box casing, said flexible pinion shaft being parallel to said drive shaft and having an impeller mounted at one end thereof;

a pinion mounted on an intermediate portion of said flexible pinion shaft, said pinion being engaged with said gear on said drive shaft;

damper bearings supporting said flexible pinion shaft, each of said damper bearings including an outer ring fixed with respect to said flexible pinion shaft, an inner ring elastically disposed on an inner peripheral surface of said outer ring, said inner ring forming an annular gap between an outer peripheral surface thereof and said inner peripheral surface of said outer ring, ball or roller bearing means disposed between said inner ring and said flexible pinion shaft for supporting said flexible pinion shaft and means for directing lubricating liquid into said annular gap; and a pair of thrust transmitting collars disposed on said flexible pinion shaft, each of said thrust transmitting collars mounted on opposite sides of said pinion, said collars extending radially from said flexible pinion shaft to contact opposite sides of said gear on said drive shaft for transmitting thrust imposed on said flexible pinion shaft to said drive shaft.

5. The gas rotary machine of claim 4, wherein adjustable spring means is disposed between said outer ring and said inner ring for adjusting displacement of said inner ring with respect to said outer ring, whereby contact is prevented between said inner ring and said outer ring due to torque applied to said flexible pinion shaft.

6. The gas rotary machine of claim 4, wherein, said means for directing lubricating liquid comprises radial holes in said outer ring and means connecting said radial holes to a lubricating liquid supply source for supplying lubricating liquid to said radial holes.

7. In a gas rotary machine having a pinion shaft with an impeller at one end thereof, a pinion on an intermediate portion of the pinion shaft, a drive shaft parallel to the pinion shaft, the drive shaft having a free end spaced from bearing means rotatably supporting the drive shaft, a gear on the free end of the drive shaft engaging the pinion, the improvement comprising:

a flexible pinion shaft as the pinion shaft;

bearing means for supporting said flexible pinion shaft; and a pair of thrust transmitting collars disposed on said flexible pinion shaft, each of said thrust transmitting collars mounted on opposite sides of the pinion, said collars extending radially from said flexible pinion shaft to contact opposite sides of the pinion, said collars extending radially from said flexible pinion shaft to contact opposite sides of the gear on the drive shaft for transmitting thrust imposed on said flexible pinion shaft to the drive shaft.

* * * * *